April 9, 1968 W. N. LINDSAY 3,377,531
VACUUM CAPACITOR
Original Filed Nov. 29, 1963

INVENTOR.
WESLEY N. LINDSAY
BY
John J. Leavitt 3,377,531
VACUUM CAPACITOR
Wesley N. Lindsay, San Jose, Calif., assignor to Jennings Radio Manufacturing Corporation, San Jose, Calif., a corporation of Delaware
Continuation of applications Ser. No. 326,696, Nov. 29, 1963, and Ser. No. 540,102, Apr. 4, 1966. This application Mar. 24, 1967, Ser. No. 625,879
10 Claims. (Cl. 317—244)

ABSTRACT OF THE DISCLOSURE

An electrode structure for hermetically sealed and vacuum capacitors utilizes an elongated strip of electrically conductive metal wound to provide free-standing spaced spiral turns. The free-standing spiral turns of one electrode are interleaved with the free-standing spaced turns of an opposed electrode. In another aspect of the invention quartz cloth may be interposed between the adjacent free-standing spiral turns of the two opposed electrodes.

---

This application is a continuation of application Serial No. 540,102, filed April 4, 1966, now abandoned, which in turn is a continuation of abandoned application Ser. No. 326,696, filed Nov. 29, 1963. The benefit of the filing dates of both of these applications is therefore hereby claimed for this application.

The invention relates to fixed capacitors, and particularly to fixed capacitors of the wound-type in which a spacer is interposed between adjacent plates of the capacitor.

Conventional capacitors are usually of two types; namely, fixed and variable, with each type utilizing either vacuum or some other insulating material to electrically isolate opposed plates. Vacuum capacitors, of both the fixed and variable variety, have found wide usage and popularity. In these capacitors, a plurality of radially spaced concentrically arranged capacitor plates arranged in sets are interleaved so as to provide a pre-determined amount of opposed surface area. The opposed plates are held apart by the inherent rigidity of the plates themselves, and the dielectric medium which electrically isolates opposed sets of plates is formed by the vacuum within the hermetically sealed envelope. One of the disadvantages of this construction is that the plates of each set are unsupported over their entire length. The length and thickness of the capacitor plates must accordingly be proportioned to provide a rigidity which is compatible with the vibration and shock characteristics of the application for which the capacitor is designed. Thus, as the plates become longer they must be thickened to provide the desired rigidity, and usually must be radially spaced a greater distance apart because with the longer plates even a small amount of vibration adjacent the root of a plate is greatly magnified at the free ends of the plates, thus undesirably varying the concentricity and therefore the capacitance of the unit.

This has necessitated relatively wide spacing between the plates to prevent plates of opposite sets from physically contacting to thereby effect a short circuit. Nevertheless, there are definite advantages to the use of a vacuum as a dielectric. One of these is the tendency of any arc or short to be shortlived. Stated another way, a vacuum dielectric capacitor possesses a quick recovery capability not found in capacitors utilizing other dielectrics.

Another disadvantage has been the extreme care with which the relatively fragile capacitor plates must be handled in order to prevent nicks, dents, and displaced portions such as dimples, which will cause variations in the spacing between plates, thus varying the capacitance characteristics and the break-down voltage characteristics of the capacitor.

In conventional wound capacitors, it has been common practice to utilize a strip of dielectric material sandwiched between opposed strips of conductive material. In such capacitors, the dielectric strip functions to electrically separate the opposing surfaces of the metallic capacitor plates. In some instances the dielectric material is a solid dielectric layer, whereas in other instances a woven dielectric fabric has been interposed between the capacitor plates. Where a solid sheet or strip of dielectric material is utilized as the dielectric between opposing plates, it is well known that the layer of dielectric material must withstand high voltage gradients. These high voltage gradients impose severe limitations on the capacitance characteristics of fixed capacitors utilizing a solid dielectric layer or strip. In wound capacitors utliizing the woven dielectric fabric between opposed capacitor plates, the fabric has functioned only as a mechanical support and not as electrical insulation between the plates, this function being performed by an oil or gas filling under a pressure sufficient to raise the breakdown voltage to the required level. Capacitors of this type are usually merely hermetically sealed, but in no instance has it been found that such a capacitor was enclosed in an evacuated chamber.

Accordingly, it is one of the principal objects of the present invention to provide a convolutely wound capacitor in which opposing plates of the capacitor, i.e., the cathode and anode, are spaced apart by a woven dielectric material which functions primarily to provide a predetermined spacing between opposed plates, and which does not determine the breakdown voltage between plates.

Another important object of the invention is the provision of a vacuum fixed capacitor in which the capacitor cathode-anode plate assembly comprises a pair of elongated metallic strips mechanically held apart by a pair of woven dielectric strips, the four strips being convolutely wound into a tightly compacted mass in which the entire lengths of the capacitor plates are supported against vibration and shock.

It has been found advisable in vacuum capacitors to process the capacitors at high temperatures in order to drive off occluded gases from the metal parts of the capacitor. In order to achieve satisfactory out-gassing, it has been found that the use of ceramic as an envelope material is superior to glass in that the ceramic may be processed at higher temperatures, thus facilitating and improving out-gassing of the metal components of the vacuum unit. One of the difficulties however has been that there is a wide variation of the thermal expansion and contraction characteristics between ceramic and metal parts which must be hermetically united to form a vacuum-tight envelope.

Ceramic may be hermetically brazed to an adjacent metal part, but provision must be made to accommodate the difference in thermal expansion and contraction of parts so united if long life is to be expected. Various methods of uniting adjacent metal and ceramic parts have been utilized, some involving graded seals in which there is a gradual matching of thermal expansion and contraction characteristics between the dielectric and adjacent metal, and others involving a multiplicity of flexible flange or ring type members which are interposed in various configurations between the ceramic and the adjacent heavy metal part to accommodate differences in thermal expansion and contraction. Such configurations, while they solve the thermal expansion and contraction problem, often create other problems such as short projections increasing the susceptibility of arc-over, often considerably increase the space requirements of the device on which they are used, and increase the length of the path over which current must flow, thus increasing inductance. It is accordingly another important object of the present invention to provide a compact vacuum tight and strain-free flexible seal between an adjacent heavy metal member and a ceramic member to which it is brazed.

The invention possesses other objects and features of advantage, some of which, with the foregoing, will be apparent from the following description and the drawings. It is to be understood however that the invention is not limited to the embodiment shown, as it may be embodied in various forms within the scope of the appended claims.

Briefly considered, the convolutely wound fixed capacitor of the invention comprises a capacitor assembly fabricated from a pair of elongated conductive metallic straps, conveniently OFHC copper or aluminum, between which is sandwiched a first strip of dielectric material such as low-loss woven quartz cloth. A second strip of the same material is superposed on the opposite side of one of the metal strips so that when the strips are wound the convolutions will be uniformly spaced by an intervening layer of dielectric. The opposed capacitor plates are wound so that adjacent edges of the opposed plates are laterally offset, so that opposite edges of adjacent plates may be conductively brazed to appropriate end plate assemblies. The end plate assemblies are held apart by and hermetically united to a dielectric envelope portion which encloses the convolutely wound capacitor plates. In order to effect a flexible hermetic union between each closely adjacent heavy metallic end plate and ceramic envelope portion, a seal is provided which is both compact and which possesses a configuration suitable for accommodating differences in thermal expansion and contraction between the metal and dielectric portions of the envelope. Means are provided within the capacitor to insure against unwinding of the spirally wound capacitor plates.

Referring to the drawings.

In terms of greater detail, the spiral or convolutely wound fixed capacitor of the invention comprises a pair of elongated conductive metallic strips 2 and 3 having their opposed flat surfaces 4 and 6, respectively, lying in parallelism and held apart by parallel and alternately arranged strips of woven dielectric material 7, preferably woven from quartz or alumina fibres or threads so as to provide a thickness compatible with the breakdown voltage of the evacuated space between the plates.

Figure 7:
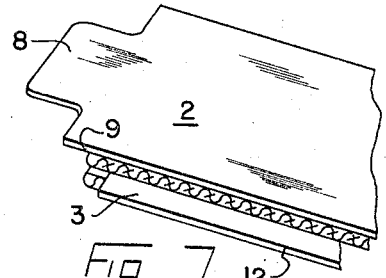
FIG. 7 is a perspective view illustrating the arrangement of dielectric and metallic strips and the end construction of one of the metallic strips which facilitates winding the composite strips into a spiral winding.
Figure 3:
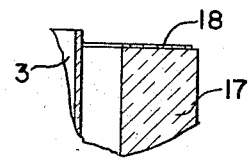
FIG. 3 is a fragmentary view of one corner of the capacitor plate assembly after it is inserted in the dielectric envelope portion but before the end plates are brazed thereto.

As shown best in FIG. 7, the metal strip 2 is preferably provided with a tab portion 8 at one end to facilitate winding of the composite pack of strips and dielectric material on a mandrel. The adjacent longitudinal edges 9 and 12 of the metal strips 2 and 3, respectively, are laterally offset so that the edge 12 of strip 3 projects a short amount beyond the edge 9 of strip 2. Conversely, the longitudinal edge 9 of the strip 2 extends laterally beyond the edge 12 of metal strip 3. With this arrangement of the strips it will be seen that upon winding of the metal and dielectric strips 2, 3 and 7, one set of fixed capacitor plates, constituted by the strip 2, will be offset axially with respect to the other set of plates constituted by the spirally wound strip 3.

Figure 6:
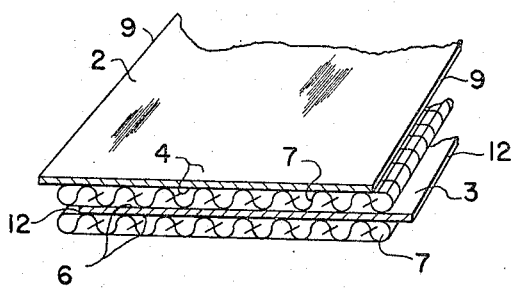
FIG. 6 is an enlarged perspective view illustrating the relationship between opposed capacitor plates and the two strips of dielectric material.
Figure 5:
FIG. 5 is a plan view of a short section of woven quartz cloth which is interposed between the plates of the capacitor.
Figure 2:
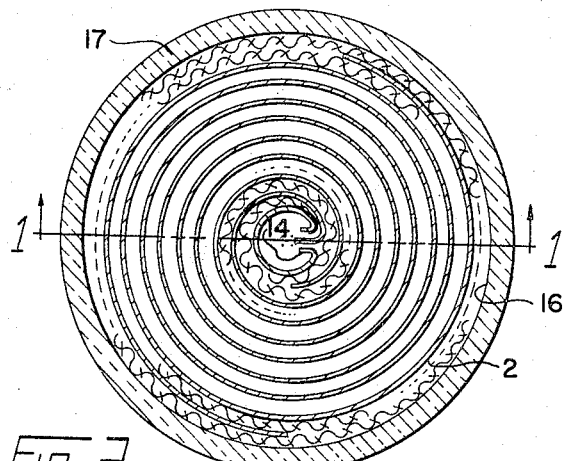
FIG. 2 is a horizontal cross-sectional view taken in the plane indicated by the line 2—2 in FIG. 1.

As shown best in FIG. 2, the strips 2 and 3, with the interposed dielectric strips, are preferably wound on a resilient core 13 split as shown to provide spaced tabs 14 permitting resilient compression of the core. Upon winding into the configuration illustrated best in FIG. 2, the wound coil is fitted into the inner periphery 16 of a tubular dielectric envelope member 17 having metalized end edges 18. The dielectric member 17 is preferably fabricated from aluminum oxide ($Al_2O_3$) which provides a vacuum tight wall having the requisite dielectric strength.

The central core member 13 is considerably shorter than the width of the strips 2 and 3. Additionally, it will be seen that the strips 2 and 3 as wound provide an overall coil length somewhat longer than the length of ceramic member 17. It has been found that when the length of the wound metallic and dielectric coil exceeds the length of the ceramic at each end by approximately .010″, assembly of the unit is greatly facilitated as will hereinafter be explained. After final assembly the overall width of the composite metallic-dielectric strip capacitor plate assembly equals the length of the ceramic member 17. From the foregoing it will be apparent that with the exterior periphery of the capacitor plate assembly confined within the inner periphery of the dielectric envelope member, the effect of the resilient core member 13 is to keep the various winding of the capacitor, both metallic and dielectric, tightly compressed between the core member and the inner periphery of the dielectric envelope member. Preferably, several turns of woven quartz strip material are wound about the last turn of metal strip to insure that the last turn of metal strip is spaced a small distance from the inner periphery of the envelope. This prevents vibration of the capacitor plates and relative movement between the plates upon impact shocks.

Figure 1:
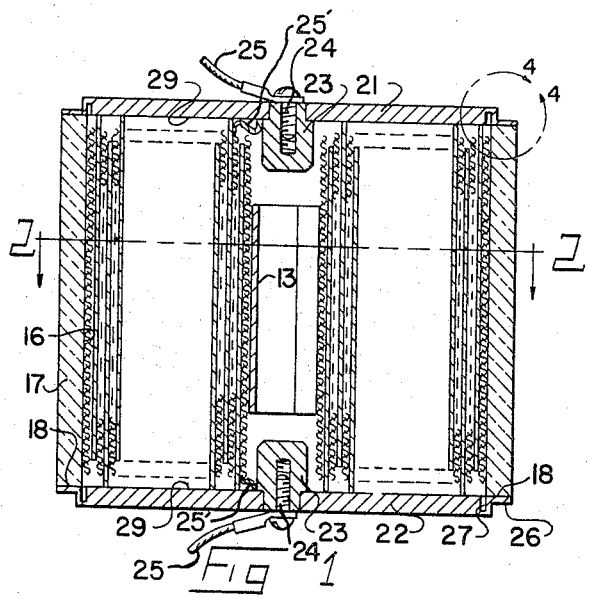
FIG. 1 is a vertical cross-sectional view taken in the plane indicated by the line 1—1 in FIG. 2.
Figure 4:
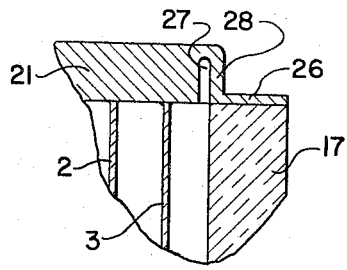
FIG. 4 is a fragmentary sectional view similar to FIG. 3 but showing the assembly after the end plates are brazed.

Closing each opposite end of the dielectric envelope member 17 are annular metallic end plates 21 and 22, shown best in FIG. 1. Each of the plates is preferably formed from oxygen-free high-conductivity copper, or some other suitable metal such as aluminum having high ductility and high electrical conductivity. Centrally disposed within the inner periphery of each plate is a boss 23 extending into the envelope and provided with a threaded bore 24. The bosses are proportioned so as not to interfere with the spiral capacitor plates or the associated ends of the resilient core member 13. They function to permit connection of the capacitor into a circuit as shown by leads 25. A flexible auxiliary lead 25′, which may be considered, in effect, an extension of lead 25, connects each end plate to the associated capacitor plate 2 or 3 while the end plates are still separated from the associated end of the ceramic envelope portion to permit electrical processing of the capacitor before the envelope is sealed.

In order to accommodate differences in thermal expansion and contraction between the end plates 21 and 22 and the abutting ceramic member 17, the outer peripheral edge portion of each of the end plates is formed in a configuration to provide a compact yet flexible union between these abutting metallic and non-metallic members. Specifically, each end plate is formed with a rabbet about its outer periphery as shown to provide a radially extending flange 26. The depth of the rabbet is proportioned so as to leave a flange with a thickness of approximately .031" and a width sufficient to span the radial thickness of the envelope wall. The rabbet and flange 26 will not by themselves provide the requisite flexibility in the union of the end plates to the associated ends of the ceramic member 17. To provide the requisite flexibility, each of the end plates is provided with an axially extending peripheral groove 27 spaced radially inwardly from the outer periphery of the end plates an amount to provide a cylindrical flange 28 on each plate having a thickness of approximately .031". It will thus be seen that with the flanges 26 hermetically brazed to the associated metalized end of ceramic member 17, differences in expansion and contraction between the metal end plates and the ceramic envelope member will be accommodated by flexure of the cylindrical flange 28. To relieve stresses which might be created by sharp corners, the flange 28 preferably merges smoothly into the end plate as shown. Since this flange is formed of the same high ductility material as the end plates, after brazing the ceramic member will dominate the metallic flange and prevent rupture of the seal.

Inasmuch as the fixed capacitor herein described is dependent upon a high vacuum as the electrically insulating medium between opposed plates, the method of assembly to insure an absolutely clean and non-contaminated interior in the envelope is of upmost importance. The invention disclosed herein thus includes as a novel aspect the method of assembly hereinafter described. After winding the coil of capacitor plates and dielectric spacer strips and fitting the coil into the ceramic envelope portion as previously described so as to have each set of plates projecting from the associated end of the ceramic a small amount, this subassembly is ready to be united to the end plates.

Prior to final assembly of the end plates on the dielectric envelope member 17, each of the plates is plated on its interior surface 29 with a layer 31 of nickel. The nickel plate performs two functions, one being that it protects the inner surface of each plate against erosion by brazing alloy, and secondly, it functions to facilitate wetting of the inner surface 29 of each of the end plates by a braze compound interposed between each such nickel plated face 29 and the adjacent ends or longitudinal edges of the capacitor plates 2 and 3.

The end plates and ceramic-enclosed coil are positioned within an appropriate vacuum oven structure (not shown) in a manner that the end plates remain spaced a short distance (¼" is adequate) from the ends of the ceramic. Braze material is of course interposed between the end edges of the ceramic and the associated flanges 26 and may be either in sheet or paste form, or pre-fused to surface 29. Electrical connection is made to each of the plates through leads 25 and 25' as shown. The oven is next evacuated and heated to a temperature at which the braze material becomes molten, but below the rapid vaporization temperature of the braze material. Gases and impurities evolved from the braze material and other parts of the assembly are removed through the vacuum system which continues to pump during the entire heating cycle. When a satisfactory degree of evacuation is reached, the spaced parts of the assembly are brought into abutting relation, whereupon the molten braze material seals all parts into a composite unit. The flexible pigtails 25' of course collapse into the central zone around bosses 23 when the end plates are brought together.

It should be noted at this point that because of the approximately .010" projection of the plates beyond the ceramic, the inner nickel plated faces 29 of the end plates engage the ends of the wound capacitor plates before the flanges 26 abut the associated ends of the ceramic. This is important because it insures that the long edge of each plate for its entire length will be embedded in a molten pool of braze material. This type of a continuous union between each condenser plate and associated end plate results in each end plate functioning as a heat sink for the condenser plate to which it is united. Such cooperation between these members also aids in drawing heat out of the quartz spacer, thus increasing the power handling capabilities of the capacitor, and functions also to lend rigidity to the condenser plate structure.

It will now be apparent that by charging the plates with potentials of opposite sign through the leads 25 and 25' the capacitor may be electrically processed by the application of high voltages before the envelope is sealed but after it has been evacuated. Impurities that are driven from the plates are quickly drawn out of the envelope through the approximately ¼" space between the ceramic and flanges 26. Upon completion of the electrical testing, the temperature is raised to melt the braze material, the end plates are moved toward each other to close the gap, whereupon the braze material hermetically seals the flanges to the ceramic and brazes the spirally wound capacitor plates to the end plates. The capacitor is now complete and may be removed from the oven after cooling for further processing and testing.

From the foregoing it will be apparent that the dielectric or insulating characteristics of the capacitor are determined by the degree of evacuation of the envelope and not by the dielectric strength of the quartz material interposed between the plates 2 and 3. Because the quartz material consititutes a woven fabric, the ready escape of gases during evacuation is permitted, thus insuring a clean interior. This would not be true if the dielectric material were an impervious sheet of material. It should be noted also that because of the nature of the woven fabric, the individual fibres thereof are subjected to relatively low voltage gradients as a result of their small size. Furthermore, since the fibres lie more-or-less parallel to the capacitor plates, the voltage gradient along the fibres is very low. The voltage gradient in the dielectric material obtained by this construction will greatly minimize any tendency for heating and degradation of the dielectric. Additionally, it will be obvious that the dielectric material, because it abuts both surfaces of plates 2 and 3, functions to mechanically strengthen the unit and provide a rigid and vibration-free capacitor.

A further advantageous feature of this construction lies in the fact that repeated arc-overs caused by transients and the like do not reduce the high insulation value of the vacuum dielectric. Metal vaporized by arcing immediately condenses on surrounding metal and does not form a continuous and conductive film because of the very large and discontinuous surface area of the fibres.

Although cloth woven of fused silicon fibres has been repeatedly mentioned in the description above by way of example, other fibrous materials are suitable and even superior to silica in some applications. For example, cloth woven from fused alumina fibres will find application at extremely high frequencies. Likewise cloth woven from glass fibres of various compositions will be useful for less severe applications, especially at lower frequencies. Felted sheets and sheets made of randomly oriented heat resistant fibres are also useful in the construction of the above-described capacitor and offer the advantage of reduced cost.

I claim:

1. In a hermetically sealed capacitor including a casing with at least one metal end plate, an electrode comprising an elongated strip of electrically conductive metal wound about an axis to provide free-standing spaced spiral turns thereabout, said end plate disposed across one end of spiral wound electrode and brazed to the spiral wound edge of the strip.

2. The sub-combination according to claim 1, in which a pair of said electrodes are provided with each electrode of the pair brazed to an associated electrically conductive plate, the spaced spiral turns of one electrode of the pair lying spaced between adjacent spiral turns of the other electrode of the pair to provide electrically insulated opposed electrodes.

3. The sub-combination according to claim 2, in which a strip of quartz cloth is spirally disposed between adjacent free-standing spiral turns of opposed electrodes.

4. The sub-combination according to claim 2, in which a resilient metallic core member is provided within the inner periphery of the spirally wound electrodes.

5. The subcombination according to claim 2, in which a vacuum-tight envelope encloses said pair of electrodes, and the surface of the plate to which each electrode is brazed lies within the vacuum envelope and is supported thereon.

6. The combination according to claim 5, in which said envelope includes a tubular ceramic portion having metalized end surfaces, and said plates supporting said electrodes are supported on the metallized end surfaces of the tubular ceramic portion.

7. A vacuum capacitor comprising an evacuated envelope disposed about a longitudinal axis, said envelope including a tubular dielectric portion and metallic end cap assemblies closing opposite ends of the tubular dielectric portion, a pair of opposed plate-like electrically conductive support surfaces spaced apart within the envelope and supported on each associated end cap assembly and disposed generally perpendicular to the long axis of the envelope, a first capacitor electrode comprising an elongated strip of electrically conductive metal wound about the said axis to provide spaced spiral turns thereabout, one spirally wound edge of the strip being brazed to one of said electrically conductive support surfaces within the envelope, and a second capacitor electrode comprising an elongated strip of electrically conductive metal wound about the said axis to provide spaced spiral turns thereabout, one spirally wound edge of the strip being brazed to the other of said electrically conductive support surfaces, the spaced spiral turns of said second electrode lying spaced between adjacent spiral turns of the first electrode to provide electrically insulated and capacitively related opposed electrodes.

8. The combination according to claim 7, in which means are provided electrically connecting each of the electrodes to the associated end cap assembly independently of said electrically conductive support surface.

9. The combination according to claim 7, in which a pair of elongated strips of quartz cloth are alternately arranged between said spirally wound strips of electrically conductive metal.

10. The combination according to claim 7, in which a resilient metal core member is disposed within one of said spirally wound electrodes and the inner end of the elongated conductive metallic strip is anchored to the core.

References Cited

UNITED STATES PATENTS 2,133,183  10/1938  Baird.
3,015,050  12/1961  Deyerl _____ 317—260 X
3,156,852  11/1964  Neibaur _____ 317—244

FOREIGN PATENTS 452,030  8/1936  Great Britain.

DARRELL L. CLAY, Primary Examiner.

L. E. ASKIN, Examiner.

E. GOLDBERG, Assistant Examiner.